(12) United States Patent

You

(10) Patent No.: US 9,692,492 B2
(45) Date of Patent: Jun. 27, 2017

(54) METHOD AND APPARATUS FOR MODULATING BASEBAND SIGNAL IN BEAM SPACE MULTI-INPUT MULTI-OUTPUT, AND METHOD FOR RECEIVING THEREIN

(71) Applicant: Electronics and Telecommunications Research Institute, Daejeon (KR)

(72) Inventor: Duk Hyun You, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/852,217

(22) Filed: Sep. 11, 2015

(65) Prior Publication Data

US 2016/0080046 A1    Mar. 17, 2016

(30) Foreign Application Priority Data

Sep. 12, 2014  (KR) .................. 10-2014-0121306
Sep. 15, 2014  (KR) .................. 10-2014-0122310
Jul. 20, 2015   (KR) .................. 10-2015-0102617
Jul. 20, 2015   (KR) .................. 10-2015-0102619

(51) Int. Cl.
*H04B 1/38*      (2015.01)
*H04L 5/16*      (2006.01)
*H04B 7/0413*    (2017.01)
*H04L 5/00*      (2006.01)
*H04L 27/20*     (2006.01)
*H01Q 21/28*     (2006.01)

(52) U.S. Cl.
CPC .......... *H04B 7/0413* (2013.01); *H01Q 21/28* (2013.01); *H04L 5/005* (2013.01); *H04L 27/20* (2013.01)

(58) Field of Classification Search
CPC ...... H04B 7/0413; H01Q 21/28; H04L 5/005; H04L 27/20
USPC .......................... 375/344, 267; 343/833, 861
See application file for complete search history.

(56) References Cited

U.S. PATENT DOCUMENTS

| 2003/0112898 | A1  | 6/2003 | Song et al. |
| 2005/0088358 | A1* | 4/2005 | Larry ....................... H01Q 1/36 343/833 |
| 2008/0122723 | A1* | 5/2008 | Rofougaran ........... H01Q 9/145 343/861 |
| 2011/0142177 | A1  | 6/2011 | Kang et al. |
| 2013/0147681 | A1* | 6/2013 | Spears ..................... H03H 7/40 343/861 |

(Continued)

FOREIGN PATENT DOCUMENTS

| EP | 1730851 B1   | 6/2009 |
| JP | 2010220031 A | 9/2010 |

(Continued)

*Primary Examiner* — Wednel Cadeau
(74) *Attorney, Agent, or Firm* — William Park & Associates Ltd.

(57) ABSTRACT

A modulation method of a baseband signal, an apparatus thereof, and a receiving apparatus thereof in a beam space MIMO are disclosed. The baseband signal modulation apparatus may calculate a load value of a plurality of antenna elements by using the baseband signal. Also, the baseband signal modulation apparatus may change the phase or the magnitude for the baseband signal or a first band signal of a higher frequency than the baseband signal by corresponding to the frequency of the baseband signal.

8 Claims, 10 Drawing Sheets

(56) References Cited

U.S. PATENT DOCUMENTS

2014/0073329 A1  3/2014  Kang et al.
2014/0120926 A1  5/2014  Shin et al.
2014/0295842 A1  10/2014  Choi et al.

FOREIGN PATENT DOCUMENTS

KR  1020060123655 A  12/2006
KR  1020140034509 A   3/2014
WO     2006003413 A1   1/2006

* cited by examiner

METHOD AND APPARATUS FOR MODULATING BASEBAND SIGNAL IN BEAM SPACE MULTI-INPUT MULTI-OUTPUT, AND METHOD FOR RECEIVING THEREIN

CROSS-REFERENCE TO RELATED APPLICATION

This application claims priority to and the benefit of Korean Patent Application No. 10-2014-0121306, 10-2014-0122310, 10-2015-0102619, and 10-2015-0102617 filed in the Korean Intellectual Property Office on Sep. 12, 2014, Sep. 15, 2014, Jul. 20, 2015 and Jul. 20, 2015, respectively, the entire contents of which are incorporated herein by reference.

BACKGROUND OF THE INVENTION (a) Field of the Invention

The present invention related to a method and an apparatus for modulating a baseband signal in a beam space MIMO.

(b) Description of the Related Art

Recently, a MIMO technique has been adopted in a variety of communication techniques. The MIMO technique has a merit of increasing a data rate and maximizing frequency efficiency. The MIMO technique has been adapted in a WiBro system, a 3GPP cellular communication system, as well as an IEEE 802.16 and IEEE 802.20 of a portable Internet system.

Transmission performance in the MIMO communication system is generally increased proportional to a number of antennas. Accordingly, the number of antennas must be increased to maximize the MIMO performance, whereby a number of RF (radio frequency) chains is also increased. When the number of antennas is increased, realization complexity thereof is increased and a size of the system is increased such that there is a drawback that the number of antennas may not be increased much. In order to escape this constraint, research to obtain the MIMO performance by using one RF or a small number of RF chains has recently progressed. As a representative example, there is a beam space MIMO technique using an ESPAR (Electrical Steering Parasitic Array Radiator) antenna or a load modulation antenna.

The beam space MIMO technique has a different point from a general MIMO technique in the antenna/RF aspect and a baseband aspect.

First, the antenna/RF aspect will be described as follows. The general MIMO technique configures the antenna by using a plurality of active antenna elements, however the beam space MIMO technique configures the antenna by using one or a small number of active antenna elements and a plurality of parasitic antenna elements. In a merit of this beam space MIMO technique, a broadening effect of the antenna number may be obtained through a plurality of parasitic antenna elements and a distance between the plurality of parasitic antenna elements may be reduced. Also, since the beam space MIO technique uses one or the small number of RF chains, the RF portion is not complicated and may be realized with a small size.

The baseband aspect will be described as follows. The general MIMO technique uses the plurality of active antenna elements and radiates the modulated baseband signal for each active antenna. Accordingly, by a phase difference and a size difference due a path through which each signal is transmitted, the phase and the magnitude of the signal radiated through the active antenna are finally determined. Each signal is passed through each path, and the phase and the magnitude of each signal radiated in the antenna is affected by a phase noise of a local oscillator or a RF impairment such as an IQ imbalance of the transmission path. The RF impairment is measured to be compensated in the baseband aspect, and the system may be configured by considering this space when configuring the RF. However, since the RF impairment (i.e., IQ imbalance or phase noise) are sharply changed and has almost a constant value, there is no problem under the compensation of a longer period.

In the beam space MIMO technique, if an entire antenna beam pattern generated by one or the small number of active antennas and the plurality of parasitic antennas is exploded, a plurality of orthogonal beams are generated. The baseband signal is mapped to the plurality of orthogonal beams. By an impedance value of the baseband signal and the plurality of parasitic antennas, a current value flowing to the plurality of parasitic antennas is changed, thereby the radiation signal mapped to the beam is finally generated. Also, the phase and the magnitude of the signal that is finally radiated is determined by the current value. That is, the phase and the magnitude of the signal that is finally radiated is changed by changing a load value (the impedance value of the plurality of parasitic antennas), thereby generating the desired radiation signal.

Meanwhile, the plurality of parasitic antennas are realized by a variable impedance element, and the value of the variable impedance element is affected by the signal that is generated in the baseband. That is, the load value must be changed whenever the value of the signal generated in the baseband is changed. Accordingly, tuning is required whenever the baseband signal is changed, and it is necessary to tune the beam space MIMO technique with a faster cycle than the general MIMO technique.

The current required by each antenna element (i.e., a plurality of parasitic antenna) is calculated with a ratio type by corresponding to a ratio of the signal generated in the baseband, and the value of the impedance of each antenna element is determined by using the current ratio. However, this conventional method does not matter in a single carrier system, however it causes the following issues in a wideband system or a multi-carrier system. When the variable impedance is realized as a capacitor component or an inductor component, since a reactance component of the variable impedance is changed along the frequency, the issue may be generated in the wideband system or the multicarrier system.

In other words, it is necessary to consider the change of the value of the variable impedance due the frequency in the beam space MIMO. The signal may not be normally transmitted by the change of the value of the variable impedance due to the frequency. When outputting the same symbol with different frequency, the phase difference and the magnitude difference are not constantly radiated. Accordingly, the phase and the magnitude of the signal that is finally radiated do not preserve the phase and the magnitude of the baseband. When measuring the phase and the magnitude of the channel for a reference signal distributed to the frequency axis, problems may occur in reliability.

Meanwhile, in the beam space MIMO, since there is only one RF chain, different from the conventional, the several signals may be simultaneously received. Accordingly, by appropriately controlling the load value in the baseband through the beam space MIMO receiver, a beam basis pattern is rotated in all directions along a time within one symbol duration to obtain the information for the MIMO signal while scanning each Beam Basis pattern. An ADC sampling frequency is changed depending a number of the Beam Basis patterns, and the ADC sampling frequency depends on the number of the Beam Basis patterns. In this case, a length of one symbol duration is constant. Accordingly, the beam space MIMO receiver changes the ADC sampling frequency to be operated with a sample number of each Beam Basis pattern maintained constantly. That is, if the number of the Beam Basis patterns scanned in one symbol duration is increased, the ADC sampling frequency is increased and a time interval of one Beam Basis pattern in the symbol duration is shortened, thereby an S(I)NR is decreased. Accordingly, when receiving a lot of streams, the S(I)NR is structurally reduced and a very small portion of streams may be received simultaneously. Thus, the merit for the MIMO mainly disappears. Accordingly, a receiving method that minimizes the performance reduction is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a method and an apparatus compensating the phase or the magnitude of the baseband in the beam space MIMO.

The present invention provides a receiving method in the beam space MIMO system receiving a phenomenon that the S(I)NR is reduced according to the number of the Beam Basis patterns that are rotated for the MIMO communication in the beam space MIMO system.

According to an exemplary embodiment of the present invention, a baseband modulation apparatus is provided. The baseband modulation apparatus includes: an antenna array including a plurality of antenna element and irradiating a beam space MIMO (Multi-Input Multi-Output) signal; a baseband unit generating a baseband signal; a band converter converting the baseband signal into a first band signal of a higher frequency than the frequency of the baseband signal; a load calculator calculating a load value of the plurality of antenna elements by using the baseband signal and setting the calculated load value to the antenna array; a signal changing controller setting a changing value for at least one value among the phase and the magnitude of the baseband signal by corresponding to the frequency of the baseband signal; and a signal change unit signal-changing at least one among the baseband signal and the first band signal by corresponding to the changing value.

The signal changing controller may set the changing value so that at least one of a phase change and a magnitude change of the antenna signal irradiated through the antenna array may be the same for each frequency of each baseband signal.

The signal changing controller may set the changing value so that the phase change of the antenna signal irradiated through the antenna array may be the same for each frequency of the baseband signal having the same phase.

The signal changing controller may set the changing value so that the magnitude change of the antenna signal irradiated through the antenna array may be the same for the frequency of the baseband signal having the same magnitude.

When the signal change unit changes the baseband signal, the signal change unit may be positioned between the baseband unit and the band converter.

When the signal change unit may change the first band signal, the signal change unit may be positioned between the band converter and the antenna array.

The signal change unit may be realized by at least one among a phase shifter, an amplifier, and an attenuator.

The plurality of antenna elements may include an active antenna element and a plurality of parasitic antenna elements, and the band converter may be a single RF chain.

The first band signal may be an IF (Intermediate Frequency) band signal or an RF (Radio Frequency) band signal.

According to another exemplary embodiment of the present invention, a baseband modulation apparatus is provided. The baseband modulation apparatus includes: an antenna array including a plurality of antenna element and irradiating a beam space MIMO (Multi-Input Multi-Output) signal; a baseband unit generating a baseband signal; a band converter converting the baseband signal into a first band signal of a higher frequency than the frequency of the baseband signal; and a load calculator calculating a first load value as a load value of the plurality of antenna element so that at least one of a phase change and a magnitude change of the antenna signal irradiated through the antenna array is the same for each frequency of each baseband signal and setting the first load value to the antenna array.

The load calculator may calculate a second load value as a load value of the plurality of antenna element by using the baseband signal and change the second load value to the first load value so that at least one of a phase change and a magnitude change of the antenna signal irradiated through the antenna array is the same for each frequency of each baseband signal.

The load calculator may calculate the first load value so that the phase change of the antenna signal irradiated through the antenna array is the same for each frequency of the baseband signal having the same phase.

The load calculator may calculate the first load value so that the magnitude change of the antenna signal irradiated through the antenna array is the same for the frequency of the baseband signal having the same magnitude.

The plurality of antenna elements may include an active antenna element and a plurality of parasitic antenna elements and the band converter may be a single radio frequency chain.

The first band signal may be an IF (Intermediate Frequency) band signal or an RF (Radio Frequency) band signal.

According to another exemplary embodiment of the present invention, a method for modulating a baseband signal in a beam space MIMO (Multi-Input Multi-Output) including a plurality of antenna elements is provided. The baseband modulation method includes: generating the baseband signal; converting the baseband signal into a first band signal of a higher frequency than the frequency of the baseband signal; calculating a load value of the plurality of antenna elements by using the baseband signal; and changing a phase or a magnitude for the baseband signal or the first band signal by corresponding to the frequency of the baseband signal.

The changing step may include: setting a changing value for the phase or the magnitude for the baseband signal or the first band signal by corresponding to the frequency of the baseband signal; and changing the baseband signal or the first band signal by corresponding to the changing value.

The setting step may include setting the changing value to that the phase change or the magnitude change of the antenna signal irradiated through the plurality of antenna elements is the same for each frequency of the baseband signal.

The setting step may include setting the changing value so that the phase change of the antenna signal irradiated through the plurality of antenna elements is the same for each frequency of the baseband signal of the same phase.

The setting step may include setting the changing value so that the magnitude change of the antenna signal irradiated through the plurality of antenna element is the same for each frequency of the baseband signal of the same magnitude.

The first band signal may be an IF (Intermediate Frequency) band signal or an RF (Radio Frequency) band signal.

According to another exemplary embodiment of the present invention, a receiving method in a receiving apparatus of a beam space MIMO (Multiple Input Multiple Output) system is provided. The receiving method of the beam space MIMO system includes: performing entire beam scanning and communication by sequentially forming a beam corresponding to an entire Beam Basis pattern during one corresponding symbol duration if a predetermined event is generated; and performing effective beam communication by reducing a number of the Beam Basis patterns used for the communication by using a result that the entire beam scanning and communication is performed in the rest of the symbol duration except for the symbol duration where the entire beam scanning and communication is performed.

The step of performing the effective beam communication may include determining the Beam Basis pattern that does not satisfy a predetermined reference among the entire Beam Basis pattern; and discarding or integrating the Beam Basis pattern that does not satisfy a predetermined reference to the other Beam Basis pattern.

The step of determining the Beam Basis pattern that does not satisfy the predetermined reference may include respectively receiving a reference signal transmitted through the entire Beam Basis pattern; and determining the Beam Basis pattern that does not satisfy the predetermined reference based on a signal quality of the reference signal.

The step of performing the effective beam communication may include increasing a scanning duration of at least one used Beam Basis pattern by replacing the scanning duration of the discarded or integrated Beam Basis pattern.

The step of performing the effective beam communication may include controlling an ADC sampling frequency based on information for the used Beam Basis pattern;

DETAILED DESCRIPTION OF THE EMBODIMENTS

Figure 1:
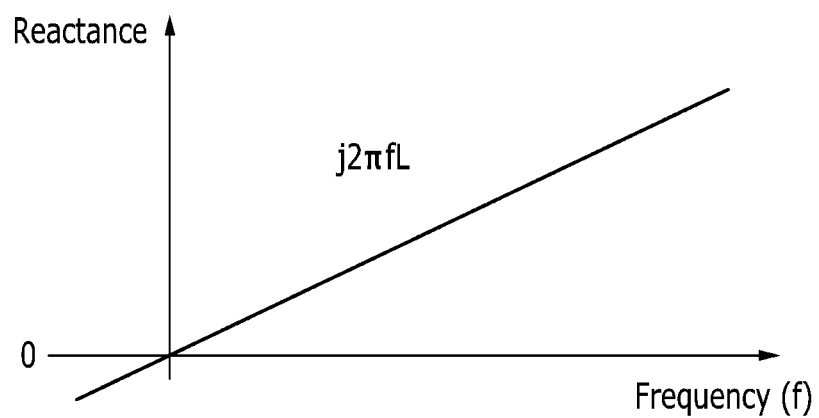
FIG. 1 is a view showing a reactance variation value depending on a frequency for a variable impedance having an inductor component.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), user equipment (UE), etc., and may include all or some of the functions of the MT, MS, AMS, HR-MS, SS, PSS, AT, UE, etc.

In the specification, a base station (BS) may indicate an advanced base station (ABS), a high reliability base station (HR-BS), a node B (NodeB), an evolved node B (eNodeB), an access point (AP), a radio access station (RAS), a base transceiver station (BTS), a mobile multihop relay base station (MMR-BS), a relay station (RS) serving as a base station, a high reliability relay station (HR-BS) serving as a base station, etc., and may include all or some of the functions of the ABS, HR-BS, NodeB, eNodeB, AP, RAS, BTS, MMR-BS, RS, HR-RS, etc.

Hereinafter, a method and an apparatus modulating a baseband signal in a beam space MIMO will be described.

In the beam space MIMO, a steering vector of a plurality of parasitic antenna elements is disassembled to generate an orthogonal basis beam transmitted with the baseband signal, and the baseband signal is loaded to the basis beam. In this case, the steering vector of each antenna element is determined by a geometric structure of the antenna, and when the geometric structure of the antenna is changed, the steering vector of the antenna is also changed. An operation loading the baseband signal to the basis beam is performed by setting a current value flowing to each antenna (i.e., parasitic antennas) with reference to the baseband signal. In this case, by changing a load value (a load value of the parasitic antenna), the current value flowing to each antenna is set. The load value has a different characteristic (i.e., a value of the variable impedance of the parasitic antenna is changed depending on the frequency) for each frequency such that the phase or the magnitude of the baseband signal may not be preserved.

Figure 2:
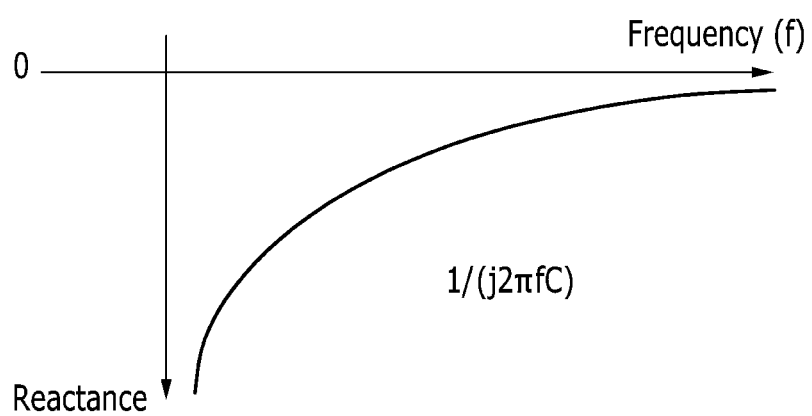
FIG. 2 is a view showing a reactance variation value depending on a frequency for a variable impedance having a capacitor component.

FIG. 1 is a view showing a reactance variation value depending on a frequency for a variable impedance having an inductor component, and FIG. 2 is a view showing a reactance variation value depending on a frequency for a variable impedance having a capacitor component.

As shown in FIG. 1, when the variable impedance by the parasitic antenna element has the inductor component, the value of the variable impedance is increased in proportion to the frequency. Also, as shown in FIG. 2, when the variable impedance by the parasitic antenna element has the capacitor component, the value of the variable impedance is increased inversely proportional to the frequency. That is, since the reactance component of the variable impedance is changed depending on the frequency, it is necessary to compensate the change of the phase or the magnitude of the antenna signal finally radiated depending on the frequency in the beam space MIMO.

To solve this problem, the method and the apparatus modulating the baseband signal according to an exemplary embodiment of the present invention compensate the change of the phase or the magnitude depending on the frequency value. Such compensation may be made on the transmission side. There are two methods for compensating the phase or magnitude depending on the frequency value. A first method is a method of changing the signal itself, and a second method realizes the frequency value of the load to be constant as much as possible in a target frequency.

The first method is a method of calculating the load value, calculating the change of the phase or magnitude for the frequency by using the change of the load value depending on the frequency, and changing the corresponding signal to have the same phase change or magnitude change for each frequency.

The first method will be described with reference to FIG. 3 to FIG. 5.

Figure 3:
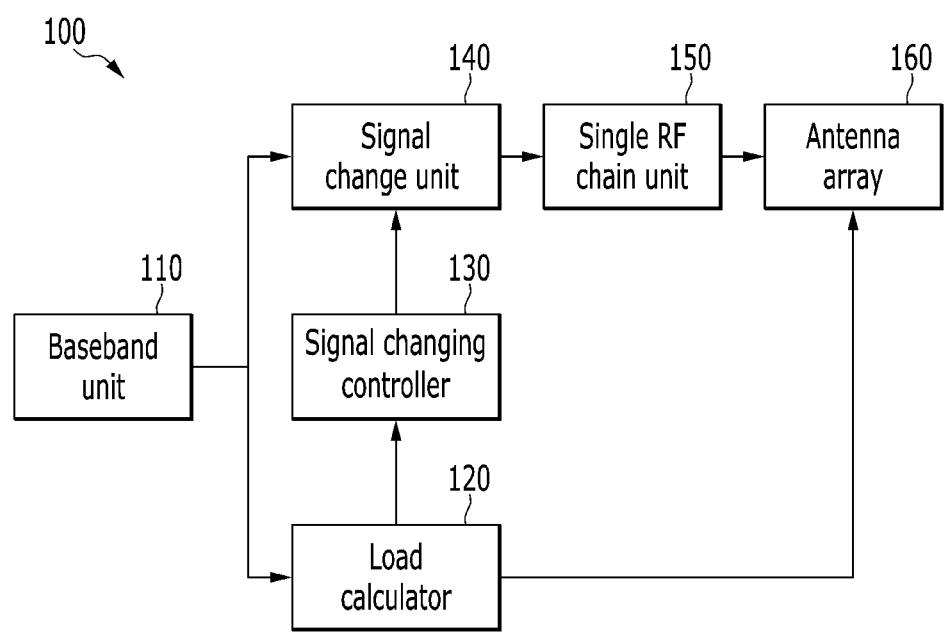
FIG. 3 is a baseband signal modulation apparatus in a beam space MIMO according to an exemplary embodiment of the present invention.

FIG. 3 is a baseband signal modulation apparatus in a beam space MIMO according to an exemplary embodiment of the present invention.

As shown in FIG. 3, a baseband signal modulation apparatus 100 in a beam space MIMO according to an exemplary embodiment of the present invention includes a baseband unit 110, a load calculator 120, a signal changing controller 130, a signal change unit 140, a single RF chain unit 150, and an antenna array 160.

The baseband unit 110 generates the baseband signal to be transmitted. The method of generating through the baseband unit 110 may be known by a person of common skill in the art and thus a detailed description thereof will be omitted.

The load calculator 120 calculates a load value for each antenna element (the parasitic antenna element) included in the antenna array 160 by using the baseband signal. That is, the load calculator 120 calculates each load value corresponding to the baseband signal. The load calculator 120 sets the load value of the antenna array 160 by corresponding to the calculated load value, thereby realizing the beam space MIMO technique. The detailed description of the method calculating the load value by using the baseband signal through the load calculator 120 will be omitted since this method is known to those having ordinary skill in the art including the present invention.

The signal changing controller 130 receives the load value calculated by the load calculator 120. The signal changing controller 130 calculates a frequency performance of the input load value to set the changing value of the phase or the magnitude for the phase change or the magnitude change to be the same for each frequency of each baseband signal. Here, the frequency performance of the load value means the change of the reactance value of each antenna element (the parasitic antenna element) for each frequency. On the other hand, the signal changing controller 130 does not calculate the frequency performance of the load value, but may sample the frequency performance of the load value to set the changing value of the phase or the magnitude for the phase change or the magnitude change to be the same for each frequency of each baseband signal.

On the other hand, the load value calculated by the load calculator 120 and the load value actually realized in the antenna array 160 may be different from each other. For this, the signal changing controller 130 may actually receive the load value of the antenna array 160 to set the changing value.

The signal changing controller 130 controls the signal change unit 140 to change the phase or the magnitude of the baseband signal depending on the changing value of the set phase or magnitude. That is, the signal changing controller 130 according to an exemplary embodiment of the present invention sets the changing value (the changing value of the phase or the magnitude) for the phase change or the magnitude change to be the same for each frequency of each baseband signal. On the other hand, the signal changing controller 130 may only calculate the phase difference depending on the frequency for the baseband signal of the same phase and may set the phase changing value for the phase difference (the phase change) depending on the frequency of the baseband signals of the same phase to be constant. Also, the signal changing controller 130 may calculate the magnitude ratio depending on the frequency for only the baseband signals of the same magnitude and may set the magnitude changing value for magnitude ratio (the magnitude change) of the baseband signals of the same magnitude to be constant.

The signal change unit 140 changes the phase or the magnitude for the baseband signal by the control of the signal changing controller 130. To change the phase, the signal change unit 140 may be realized by a phase shifter. To change the magnitude, the signal change unit 140 may be realized by an amplifier or an attenuator. That is, the signal change unit 140 according to an exemplary embodiment of the present invention compensates the phase or the magnitude of the baseband signal by corresponding to the predetermined changing value (the changing value of the phase or the magnitude) by the signal changing controller 130. On the other hand, the signal changing controller 130 and the signal change unit 140 may be included in the baseband unit 110. For this operation, when the baseband signal is a time signal, the baseband signal is divided into each frequency signal through FFT (Fast Fourier Transform) and a phase component or a magnitude component to be changed is added to each frequency component. Also, the signal added with the phase component or magnitude component is changed into the time signal through IFFT (Inverse Fast Fourier Transform).

The single RF chain unit 150 forms one RF chain and converts the baseband signal in which the magnitude or the phase is changed into an RF band signal. Here, one RF chain may be realized by a DAC (Digital Analog Converter), a filter, or an oscillator. Alternatively, the single RF chain unit 150 may be a small number of RF chains rather than one RF chain.

The antenna array 160 may include one active antenna and a plurality of parasitic antennas to generate a beam space MIMO signal. The antenna array 160 may be realize through an ESPAR, a SPA (Switched Parasitic Array), or a load modulation antenna, and other structures may be included to realize the beam space MIMO. The antenna array 160 may set the load value of the plurality of parasitic antennas depending on the calculated load value to the load calculator 120.

On the other hand, like the first method as the method of changing the signal itself, as shown in FIG. 3, the baseband signal is not changed, but the RF band signal may be changed. The method of changing the RF band signal will be described with reference to FIG. 4.

Figure 4:
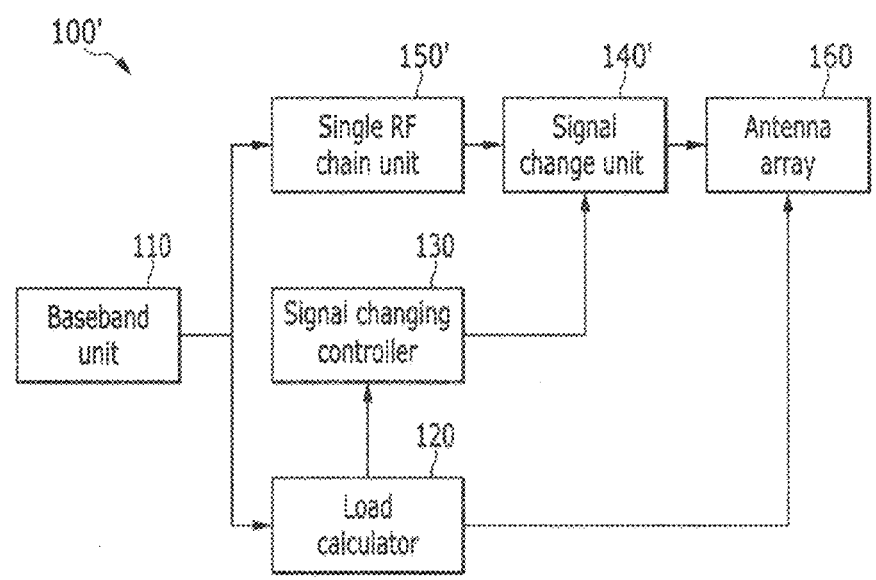
FIG. 4 is a baseband signal modulation apparatus in a beam space MIMO according to another exemplary embodiment of the present invention.

FIG. 4 is a baseband signal modulation apparatus in a beam space MIMO according to another exemplary embodiment of the present invention. FIG. 4 is the same as FIG. 3 except for changing the RF band signal instead of changing the baseband signal.

As shown in FIG. 4, in the beam space MIMO according to another exemplary embodiment of the present invention, a baseband signal modulation apparatus 100' includes a baseband unit 110, a load calculator 120, a signal changing controller 130, a signal change unit 140', a single RF chain unit 150', and an antenna array 160. Referring to FIG. 4, differently from FIG. 4, the signal change unit 140' is positioned in the next stage of the single RF chain unit 150'.

The baseband unit 110 generates the baseband signal to be transmitted.

The load calculator 120 calculates a load value for each antenna element (the parasitic antenna element) included in the antenna array 160 by using the baseband signal.

The signal changing controller 130 receives the load value calculated by the load calculator 120 and calculates the frequency performance of the input load value to set the changing value of the phase or magnitude for the phase change or the magnitude change to be the same for each frequency of each baseband signal.

The single RF chain unit 150' converts the baseband signal into the RF band signal. Here, the single RF chain unit 150' may include an IF band converter (not shown) converting the baseband signal onto an IF (Intermediate Frequency) band signal. When the single RF chain unit 150' includes the IF band converter, the single RF chain unit 150' converts the IF band signal into the RF band signal. In this case, the IF band signal and the RF band signal have the high frequency as the frequencyDeletedTextsof the baseband signal. DeletedTexts Accordingly, the single RF chain unit 150' and the IF band converter may be collectively referred to as a band converter.

The signal change unit 140' changes the phase or the magnitude for the RF band signal (symbol) by the control of the signal changing controller 130. On the other hand, the signal change unit 140' may change the phase or the magnitude of the IF band by the control of the signal changing controller 130. Hereinafter, for convenience of description, the phase or the magnitude for the RF band signal is changed, however the phase and the magnitude for the IF band signal may be changed instead of the RF band signal.

The antenna array 160 may include one active antenna and a plurality of parasitic antennas to generate a beam space MIMO signal. The antenna array 160 may set the load value of the plurality of parasitic antennas depending on the calculated load value to the load calculator 120.

On the other hand, in FIG. 3 and FIG. 4, one of the phase or the magnitude may be changed or the phase and the magnitude may both be changed. In this case, when only changing the phase, the signal change unit 140 may be realized only by a phase shifter, when only changing the magnitude, the signal change unit 140 may be realized only by the amplifier or the attenuator.

Also, in FIG. 4, the signal change unit 140' may be included in the single RF chain unit 150 to change the RF band signal in the single RF chain unit 150.

Figure 5:
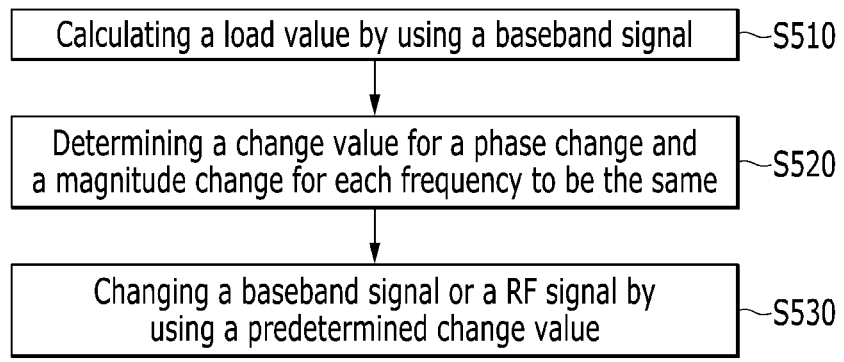
FIG. 5 is a flowchart showing a baseband signal modulation method in a beam space MIMO according to an exemplary embodiment of the present invention.

FIG. 5 is a flowchart showing a baseband signal modulation method in a beam space MIMO according to an exemplary embodiment of the present invention.

First, the load calculator 120 calculates the load value by using the baseband signal (S510). The load calculator 120 calculates the load value of each parasitic antenna (the parasitic antenna of the antenna array 160) corresponding to the baseband signal.

The signal changing controller 130 sets the changing value of the phase or the magnitude by using the load value calculated in the step S510 for the phase change or the magnitude change for each frequency to be the same (S520). That is, the signal changing controller 130 sets the changing value (the changing value of the phase or the magnitude) for the phase change or the magnitude change for the signal finally irradiated through the antenna for each frequency of each baseband signal. Alternatively, the signal changing controller 130 may calculate the phase change (difference) depending on the frequency only for the baseband signals of the same phase, and may set the phase changing value for the phase change depending on the frequency of the baseband signals of the same phase to be constant. Also, the signal changing controller 130 may calculate the magnitude change (magnitude ratio) depending on the frequency only for the baseband signals of the same magnitude, and may set the magnitude changing value for the magnitude change of the baseband signal of the same magnitude to be constant.

The signal change unit (140 or 140') changes the phase or the magnitude for the baseband signal or the RF band signal by using the changing value predetermined in the step S520 (S530).

As described above, the baseband signal (or the RF band signal) compensated with the phase or the magnitude is finally input to the antenna array 160, thereby compensating the change of the phase or the magnitude depending on the frequency.

Hereinafter, a method of providing an additional condition to the load value calculation as a second method will be described with reference to FIG. 6 and FIG. 7.

The second method is a method of adding the condition for the phase or the magnitude depending on the frequency when calculating the load value for the frequency value to be constant at a maximum in a target frequency.

Figure 6:
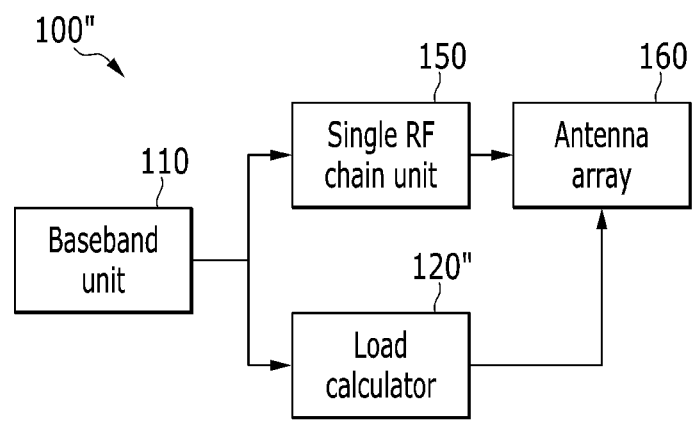
FIG. 6 is a baseband signal modulation apparatus in a beam space MIMO according to another exemplary embodiment of the present invention.
Figure 7:
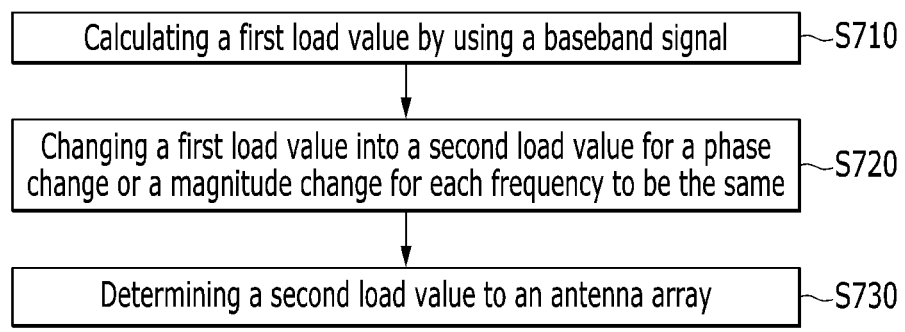
FIG. 7 is a flowchart showing a baseband signal modulation method in a beam space MIMO according to another exemplary embodiment of the present invention.

FIG. 6 is a baseband signal modulation apparatus in a beam space MIMO according to another exemplary embodiment of the present invention, and FIG. 7 is a flowchart showing a baseband signal modulation method in a beam space MIMO according to another exemplary embodiment of the present invention.

As shown in FIG. 6, in the beam space MIMO according to another exemplary embodiment of the present invention, the baseband signal modulation apparatus 100'' includes a baseband unit 110, a load calculator 120'', a single RF chain unit 150, and an antenna array 160.

The baseband unit 110 generates the baseband signal to be transmitted.

The load calculator 120" calculates the load value for each antenna element included in the antenna array 160 by using the baseband signal. In this case, the load calculator 120" grants the additional condition to the load value calculation. The method granting the additional condition will be described with reference to FIG. 7.

Firstly, the load calculator 120" calculates a first load value by using the baseband signal (S710). In this case, the first load value means the load value considering only the baseband signal without considering the change of the phase or the magnitude. When only the first load value is set in the antenna array 160, the phase or the magnitude may be changed for each frequency of each baseband signal. To compensate this, the load calculator 120" changes the first load value into a second load value for the phase change or the magnitude change for the frequency of each baseband signal to be the same (S720). Here, when it is not necessary for the phase or the magnitude to be changed, the second load value may be the same as the first load value. Also, the load calculator 120" sets the second load value to the antenna array 160 (S730). That is, the final second load value is set as the load value of the antenna array 160, thereby compensating the phase change or the magnitude change depending on the frequency that may be generated in the beam space MIMO.

The single RF chain unit 150 converts the baseband signal into the RF band signal. Also, the antenna array 160 may include one active antenna and a plurality of parasitic antennas. In this case, the antenna array 160 may set the load value of the plurality of parasitic antennas depending on the second load value calculated in the load calculator 120.

In the description, the case that the phase of the baseband signal must be compensated is a case that the information is transmitted through the phase. A representative example is a PSK (Phase Shift Keying) modulation method. The case that the magnitude of the baseband signal must be compensated is a case that the information is transmitted through the magnitude. A representative example is an ASK (Amplitude Shift Keying) modulation method. Also, the case that the magnitude and the phase of the baseband signal must both be preserved is the case that the information is transmitted through the magnitude and the phase. A representative example is a QAM (Quadrature Amplitude Modulation) method.

In the case of the ASK modulation method, the information may be transmitted even if the phase information is not compensated. Also, in the case of the PSK modulation method, the information may be transmitted even if the magnitude information is not compensated. However, in the case of the magnitude, since a capacity of a power amp is limited, it may be limited to not more than a certain magnitude depending on the circumstance even in the PSK method.

Next, a receiving method and an apparatus thereof in a beam space MIMO system according to an exemplary embodiment of the present invention will be described with reference to accompanying drawings.

Figure 8:
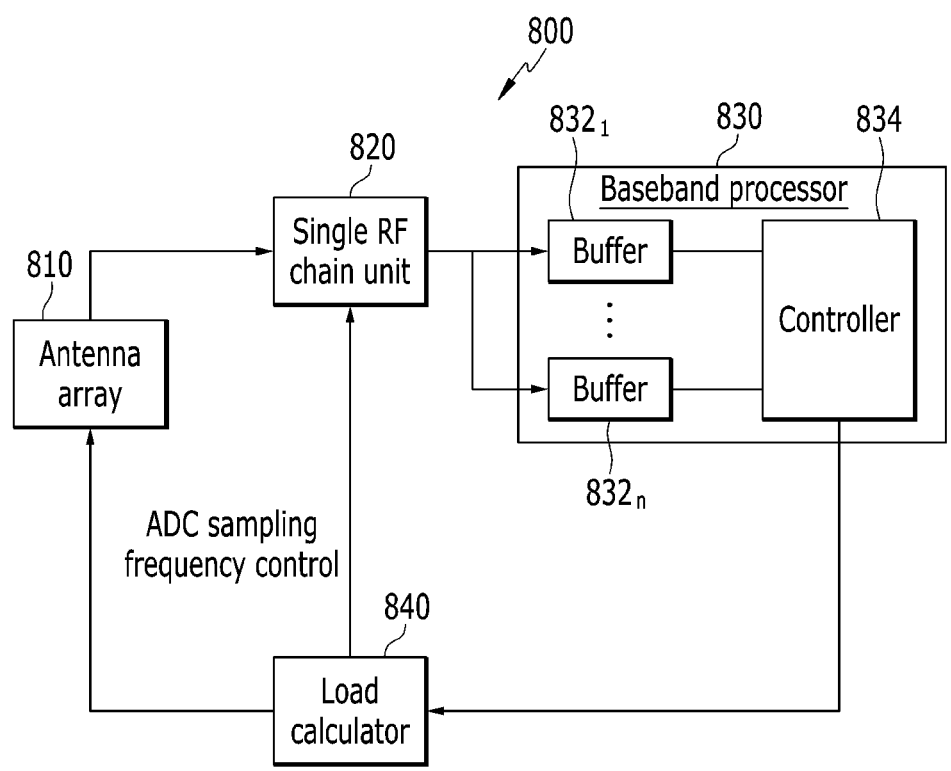
FIG. 8 is a view showing one example of a receiving apparatus of a beam space MIMO system according to an exemplary embodiment of the present invention.

FIG. 8 is a view showing one example of a receiving apparatus of a beam space MIMO system according to an exemplary embodiment of the present invention.

Referring to FIG. 8, a receiving apparatus 800 of a beam space MIMO system includes an antenna array 810, a single RF chain unit 820, a baseband processor 830, and a load calculator 840.

The antenna array 810 receives the signal transmitted into the beam space by the transmitting apparatus of the beam space MIMO system. The antenna array 810 may include one active antenna element and a plurality of parasitic antenna element. The transmitting apparatus of the beam space MIMO system maps the data symbol to each Beam Basis pattern in the beam space during one symbol cycle to be transmitted through one RF chain. The transmitting apparatus uses the Beam Basis patterns that are orthogonal in the beam space.

The antenna array 810 forms the beam of the Beam Basis pattern corresponding to the control of the load calculator 840 and receives the signal through the formed beam. The antenna array 810 may be realized by the ESPAR (Electrical Steering Parasitic Array Radiation), the SPA (Switched Parasitic Array), and the load modulation antenna, and may have the other structure to realize the beam space MIMO.

The single RF chain unit 820 includes one RF chain or a smaller number of RF chains than the antenna number of the antenna array 810, and converts the RF band signal received through the antenna array 810 into the baseband signal. In detail, the single RF chain unit 820 converts the analog signal into the digital signal of the baseband depending on the ADC sampling frequency. The single RF chain unit 820 may change the ADC sampling frequency depending on the ADC sampling frequency control of the load calculator 840.

The baseband processor 830 processes the baseband signal to extract a data. The baseband processor 830 includes a plurality of buffers $832_1$-$832_n$, and a controller 834. Here, n is a number of the Beam Basis pattern. Each of the buffers $832_1$-$832_n$ stores the received signal of the corresponding Beam Basis pattern. The controller 834 determines the number of effective Beam Basis patterns based on the received signal corresponding to the Beam Basis pattern. The controller 834 transmits the information for the effective Beam Basis pattern and transmits it to the information load calculator 840 to perform effective beam communication later.

The load calculator 840 calculates the load value for each antenna element (parasitic antenna element) included in the antenna array 810 by using the baseband signal, and controls each antenna element depending on the load value for each antenna element (the parasitic antenna element).

If a certain event is generated, the load calculator 840 may control the antenna array 810 to sequentially form the beam corresponding to the entire Beam Basis pattern during one corresponding symbol duration. An operation of sequentially forming the beam corresponding to the entire Beam Basis pattern during one symbol duration to receive the signal is referred to as "entire beam scanning and communication".

In general, the channel viewed from the receiving apparatus 800 is often unable to maintain a good coefficient (condition number) with an entire rank (full rank). Also, in general, the channel environment is not suddenly changed in a short time. Accordingly, like the receiving apparatus of a conventional beam space MIMO system, performing the entire beam scanning and communication operation during each symbol duration may cause a resource waste. Also, if the entire beam scanning and communication operation is performed one time in one position, a method of determining whether one Beam Basis pattern is meaningful through an analysis of the received signal exists. Accordingly, the load calculator 840 does not perform the entire beam scanning and communication in each symbol duration, but performs the entire beam scanning and communication only when a specific event occurs. The specific event may include a command of the base station or an upper level, or a predetermined cycle of the entire beam scanning and communication. The command of the base station or the upper level may be transmitted in a circumstance in which it is necessary to again search the channel such as a cell search and a power-on.

Also, the load calculator 840 reduces the number of Beam Basis patterns to be used based on the result of performing the entire beam scanning and communication in the symbol duration when the entire beam scanning and communication is not performed to perform the effective beam communication. Here, the effective beam communication means an operation of forming the beam corresponding to the Beam Basis pattern of the smaller number than the number of all entire Beam Basis patterns during one symbol duration to receive the signal. In this case, the ADC sampling frequency of the single RF chain unit 820 must be able to change depending on the effective Beam Basis pattern. That is, the ADC sampling frequency of the symbol duration performing the entire beam scanning and communication and the ADC sampling frequency of the symbol duration performing the effective beam communication may be different from each, and the ADC sampling frequency of the symbol duration performing the effective beam communication is always set to be less than the ADC sampling frequency of the symbol duration performing the entire beam scanning and communication. The load calculator 840 receives the information for the effective Beam Basis pattern from the baseband processor 830 to control the ADC sampling frequency.

As described above, by reducing the number of Beam Basis patterns used in the MIMO communication through the effective beam communication, the S(I)NR deterioration may be maximally prevented.

Figure 9:
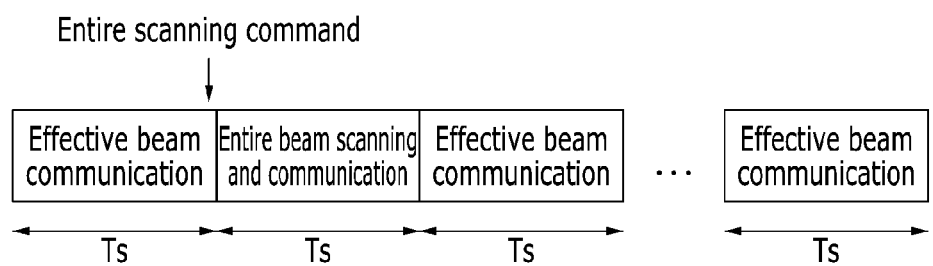
FIG. 9 is a view showing one example of a beam space MIMO receiving method according to an exemplary embodiment of the present invention.

FIG. 9 is a view showing one example of a beam space MIMO receiving method according to an exemplary embodiment of the present invention.

Referring to the drawing, if the load calculator 840 receives the entire scanning command, the antenna array 810 is controlled so that the entire beam scanning and communication is performed during one corresponding symbol duration Ts, and the effective beam communication performing the MIMO communication is performing by using the only effective beam without the scanning of the entire beam during the rest of the symbol duration Ts.

If the entire scanning command is received from the base station or the upper level, the load calculator 840 may control the antenna array 810 for the entire beam scanning and communication to be immediately performed during the symbol duration Ts, and may control the antenna array 810 to perform the entire beam scanning and communication in any one symbol duration Ts with the time difference.

Figure 10:
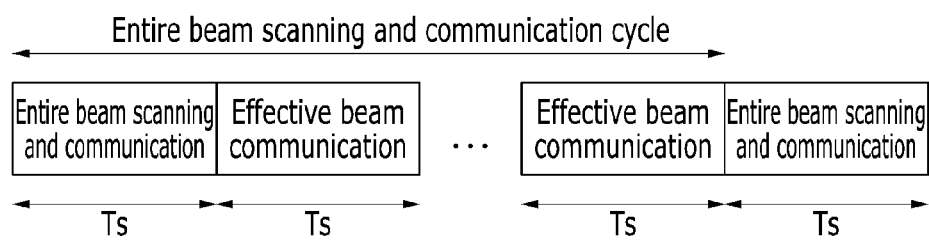
FIG. 10 is a view showing another example of a beam space MIMO receiving method according to an exemplary embodiment of the present invention.

FIG. 10 is a view showing another example of a beam space MIMO receiving method according to an exemplary embodiment of the present invention.

As shown in FIG. 10, the load calculator 840 may control the antenna array 810 so that the entire beam scanning and communication is performed during one symbol duration Ts depending on the predetermined cycle of the entire beam scanning and communication, and may control the antenna array 810 so that the effective beam communication is performed during the rest of the symbol duration.

Also, the load calculator 840 may control the antenna array 810 so that the entire beam scanning and communication is also performed during one symbol duration Ts if the entire scanning command is received within the cycle of the entire beam scanning and communication.

Figure 11:
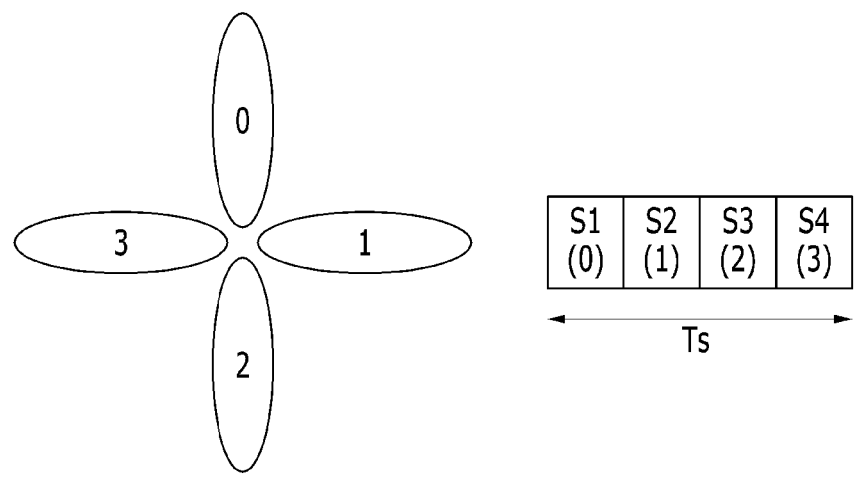
FIG. 11 is a view showing one example of a method of performing an entire beam scanning and communication according to an exemplary embodiment of the present invention.

FIG. 11 is a view showing one example of a method of performing entire beam scanning and communication according to an exemplary embodiment of the present invention.

Referring to FIG. 11, the number of the entire Beam Basis patterns 0, 1, 2, and 3 is 4, and the load calculator 840 divides one symbol duration Ts into 4 slot durations S1, S2, S3, and S4 and controls the antenna array 110 to form the Beam Basis patterns 0, 1, 2, and 3 in the slot durations S1, S2, S3, and S4, respectively.

Figure 12:
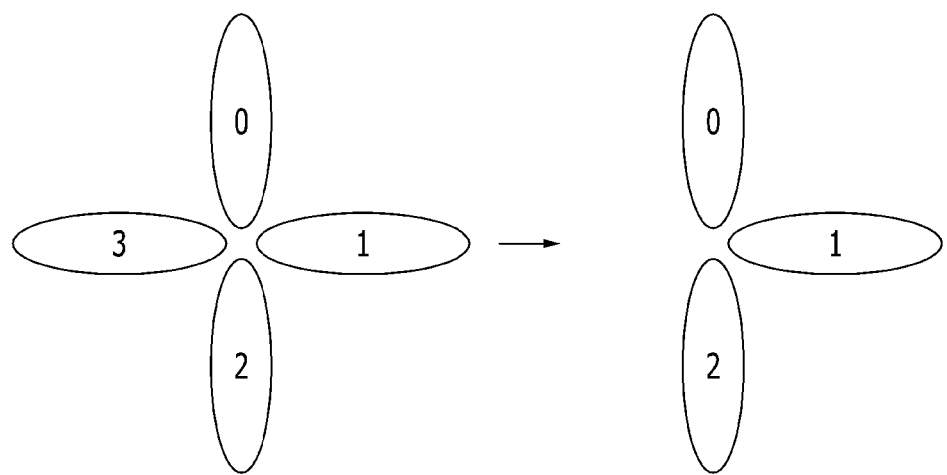
FIG. 12 and FIG. 13 are views showing one example of a method of reducing a number of Beam Basis patterns according to an exemplary embodiment of the present invention, respectively.
Figure 13:
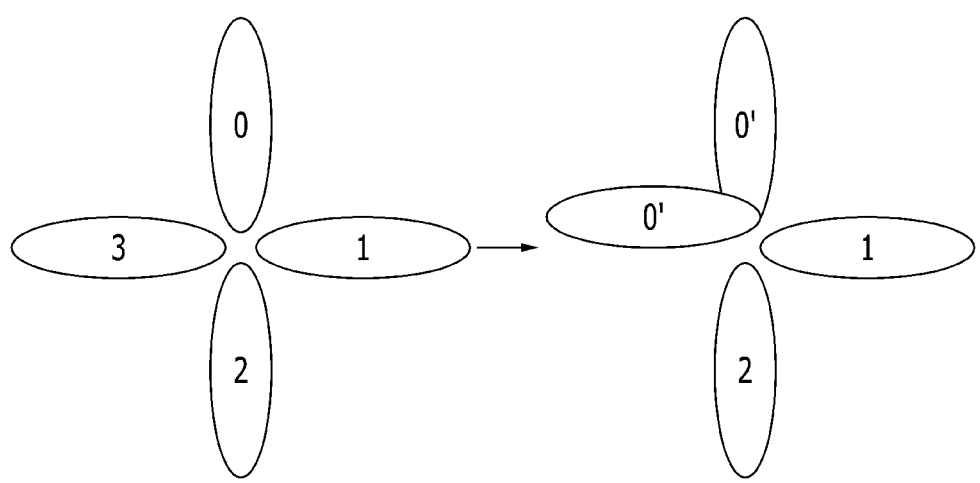

FIG. 12 and FIG. 13 are views showing one example of a method of reducing a number of Beam Basis patterns according to an exemplary embodiment of the present invention, respectively.

Referring to FIG. 12, the load calculator 840 discards the Beam Basis pattern that does not satisfy a predetermined reference among the entire Beam Basis patterns 0, 1, 2, and 3 without usage. For example, when the Beam Basis pattern 3 does not satisfy the predetermined reference among 4 Beam Basis patterns 0, 1, 2, and 3, the load calculator 840 may only use three Beam Basis patterns 0, 1, and 2.

Also, referring to FIG. 13, the load calculator 840 may use the Beam Basis pattern that does not satisfy the predetermined reference among the entire Beam Basis patterns 0, 1, 2, and 3 by integrating with other Beam Basis patterns. For example, when the Beam Basis pattern 3 does not satisfy the predetermined reference among 4 Beam Basis patterns 0, 1, 2, and 3, the load calculator 840 may form the Beam Basis pattern 0' of which the Beam Basis pattern 3 is integrated with the Beam Basis pattern 0 and may use the Beam Basis patterns 0', 1, and 2.

In this case, the Beam Basis pattern that does not satisfy the predetermined reference among the entire Beam Basis patterns 0, 1, 2, and 3 may be determined in the baseband processor 830.

The baseband processor 830 may set the several references required when reducing the Beam Basis pattern. For example, the reference may be set as the Beam Basis pattern such that the magnitude (intensity) or an S(I)NR of the receive reference signal is more than a predetermined threshold value. The transmitting apparatus transmits the reference signal through each Beam Basis pattern used in the beam space. The reference signal may include discrimination information of the Beam Basis pattern. The baseband processor 830 measures the magnitude (intensity) or the S(I)NR of the received reference signal and compares whether the magnitude (intensity) or the S(I)NR of the received reference signal is more than the predetermined threshold value to determine the Beam Basis pattern that does not satisfy the reference. The load calculator 840 may not use the Beam Basis pattern that does not satisfy the reference or may integrate the other Beam Basis pattern.

For example, the reference may be set as the Beam Basis pattern such that the magnitude (intensity) or the S(I)NR of the received reference signal is more than the predetermined threshold value and the S(I)NR of the reference signal corresponds to a top predetermined number. Thereby, even if the magnitude (intensity) or the S(I)NR of the received reference signal is more than the predetermined threshold value, only the S(I)NR having the good Beam Basis pattern may be used excluding the Beam Basis pattern having the bad S(I)NR, the S(I)NR deviation of the used Beam Basis pattern may be reduced, and the good channel condition coefficient may be obtained. As described above, according to the effect that the number of the Beam Basis patterns is reduced, there are effects that the S(I)NR is entirely increased, and the average S(I)NR is increased excluding the Beam Basis pattern having the bad S(I)NR.

In this case, as the number of the Beam Basis patterns used is decreased, the time remaining for the scanning may split the used Beam Basis pattern.

Figure 14:
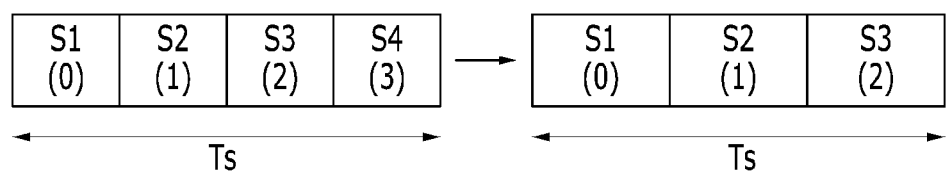
FIG. 14 and FIG. 15 are views showing one example of a method of performing effective beam communication, respectively.
Figure 15:
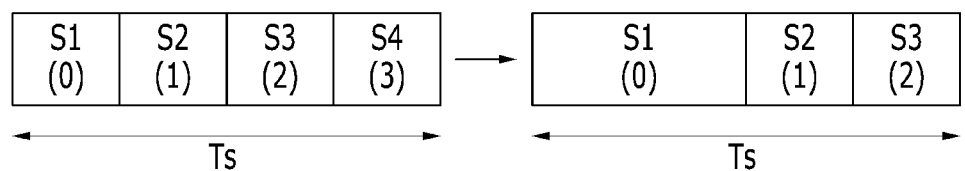

FIG. 14 and FIG. 15 are views showing one example of a method of performing effective beam communication, respectively.

Referring to FIG. 14, when only using three Beam Basis patterns 0, 1, and 2 among four Beam Basis patterns 0, 1, 2, and 3, the load calculator 840 may evenly distribute the slot duration [S4 3] for scanning the Beam Basis pattern 3 to the slot durations [S1 0, S2 1, S3 2] for scanning three Beam Basis patterns 0, 1, and 2. Accordingly, the slot durations [S1 0, S2 1, S3 2] scanning the Beam Basis patterns 0, 1, and 2 are elongated.

Alternatively, referring to FIG. 15, the load calculator 840 sequentially grants an appropriate weight value that satisfies the predetermined reference to the used Beam Basis patterns 0, 1, and 2 and may distribute to the slot duration [S4 3] scanning the Beam Basis pattern 3 to the Beam Basis pattern 0, 1, and 2 depending on the predetermined weight value. For example, depending on the predetermined weight value of the Beam Basis pattern 0, 1, and 2, the slot duration [S1 0] scanning the Beam Basis pattern 0 may only be increased by the slot duration [S4 3] scanning the Beam Basis pattern 3. In this case, in proportion or inverse proportion to the weight value predetermined for the Beam Basis patterns 0, 1, and 2, the slot duration [S4 3] scanning the Beam Basis pattern 3 may be distributed into at least one among the slot durations [S1 0, S2 1, S3 2] scanning the Beam Basis patterns 0, 1, and 2.

According to an exemplary embodiment of the present invention, by changing the phase or the magnitude of the baseband signal depending on the frequency value, the phase or the magnitude of the baseband signal may be compensated. Thereby, the channel estimation may also be normal in the beam space MIMO.

According to another exemplary embodiment of the present invention, in the beam space MIMO system, an S(I)NR deterioration generated while all-direction rotation (a full rotation) is performed every symbol duration may be prevented, and accordingly, the MIMO performance may be maximally improved by providing the channel ensuring the good S(I)NR to the receiving apparatus.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A baseband modulation apparatus comprising:
   an antenna array including a plurality of antenna element and irradiating a beam space MIMO (Multi-Input Multi-Output) signal;
   a baseband unit generating a baseband signal;
   a band converter converting the baseband signal into a first band signal of a higher frequency than the frequency of the baseband signal;
   a load calculator calculating a load value of the plurality of antenna elements by using the baseband signal and setting the calculated load value to the antenna array;
   a signal changing controller setting a changing value for at least one value among the phase and the magnitude of the baseband signal by corresponding to the frequency of the baseband signal; and
   a signal change unit signal-changing at least one among the baseband signal and the first band signal by corresponding to the changing value,
   wherein the signal changing controller sets the changing value so that at least one of a base chap e and a magnitude change of the antenna signal irradiated through the antenna array is the same for each frequency of each baseband signal.

2. The baseband modulation apparatus of claim 1, wherein the signal changing controller sets the changing value so that the phase change of the antenna signal irradiated through the antenna array is the same for each frequency of the baseband signal having the same phase.

3. The baseband modulation apparatus of claim 1, wherein the signal changing controller sets the changing value so that the magnitude change of the antenna signal irradiated through the antenna array is the same for the frequency of the baseband signal having the same magnitude.

4. The baseband modulation apparatus of claim 1, wherein when the signal change unit changes the baseband signal, the signal change unit is positioned between the baseband unit and the band converter.

5. The baseband modulation apparatus of claim 1, wherein when the signal change unit changes the first band signal, the signal change unit is positioned between the band converter and the antenna array.

6. The baseband modulation apparatus of claim 1, wherein the signal change unit is realized by at least one among a phase shifter, an amplifier, and an attenuator.

7. The baseband modulation apparatus of claim 1,
   wherein the plurality of antenna elements include an active antenna element and a plurality of parasitic antenna elements; and
   the band converter is a single RF chain.

8. The baseband modulation apparatus of claim 1,
   wherein the first band signal is an intermediate frequency (IF) band signal or an radio frequency (RF) band signal.

* * * * *